(12) United States Patent
Gretz et al.

(10) Patent No.: US 9,293,900 B1
(45) Date of Patent: Mar. 22, 2016

(54) TWO-PIECE DUPLEX ELECTRICAL FITTING WITH EXTERNAL CABLE RETAINER

(71) Applicant: Arlington Industries, Inc., Scranton, PA (US)

(72) Inventors: Thomas J. Gretz, Port St. Lucie, FL (US); Daniel O'Neil, Moscow, PA (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 14/726,488

(22) Filed: May 30, 2015

Related U.S. Application Data

(60) Provisional application No. 62/006,063, filed on May 31, 2014.

(51) Int. Cl.
*H02G 3/18* (2006.01)
*H02G 3/06* (2006.01)

(52) U.S. Cl.
CPC ............ *H02G 3/0625* (2013.01); *H02G 3/18* (2013.01)

(58) Field of Classification Search
CPC ....... H02G 3/066; H02G 3/0691; H02G 3/18; H02G 3/06; H02G 3/0666; H02G 3/0625; H02G 3/0616; H01R 31/02; H01R 13/745; H01R 13/74; H01R 13/741
USPC ................ 174/660, 665, 653, 659, 668, 135; 174/152 G, 153 G, 151, 650, 59, 60, 61; 248/56, 49, 68.1; 285/149.1, 154.1
See application file for complete search history.

(56) References Cited

U.S. PATENT DOCUMENTS

| | | | | |
|---|---|---|---|---|
| 6,194,661 B1 * | 2/2001 | Gretz | ............... | H01R 13/745 174/650 |
| 6,521,831 B1 * | 2/2003 | Gretz | ............... | H01R 13/745 174/659 |
| 7,075,007 B2 * | 7/2006 | Auray | ............... | H02G 3/0691 174/668 |
| 7,161,095 B1 * | 1/2007 | Gretz | ............... | H02G 3/0666 174/659 |
| 7,304,251 B1 * | 12/2007 | Gretz | ............... | H02G 3/0691 174/659 |
| 7,723,623 B2 * | 5/2010 | Kiely | ............... | H02G 3/0691 174/659 |

* cited by examiner

*Primary Examiner* — Angel R Estrada

(57) ABSTRACT

A duplex electrical connector constructed of two body portions with internal bores. The body portions easily assemble and disassemble in a sliding manner, the direction of the assembly and disassembly being substantially at right angles to the axes of the internal bores. A front connector body includes a leading end and a trailing end with a lip, a trailing flange, and a bottom periphery. A tab with an aperture therein extends from the top lip. A rear connector body includes a leading end with a front extension, a boss, a trailing end, and two internal bores extending from the trailing end to the leading end. Sliding assembly of the connector bodies enables minimizing the size of the connector bodies for reducing unit production costs while enabling easy disassembly of the two connector body portions for inspection of internal cable connections.

13 Claims, 11 Drawing Sheets

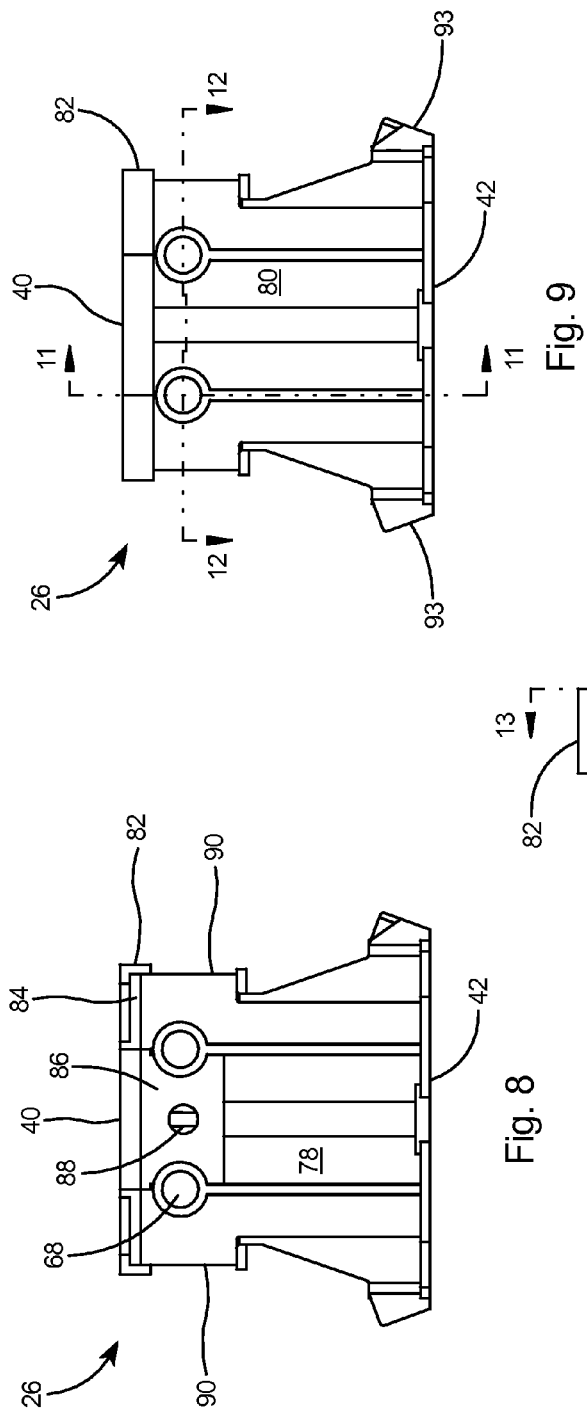

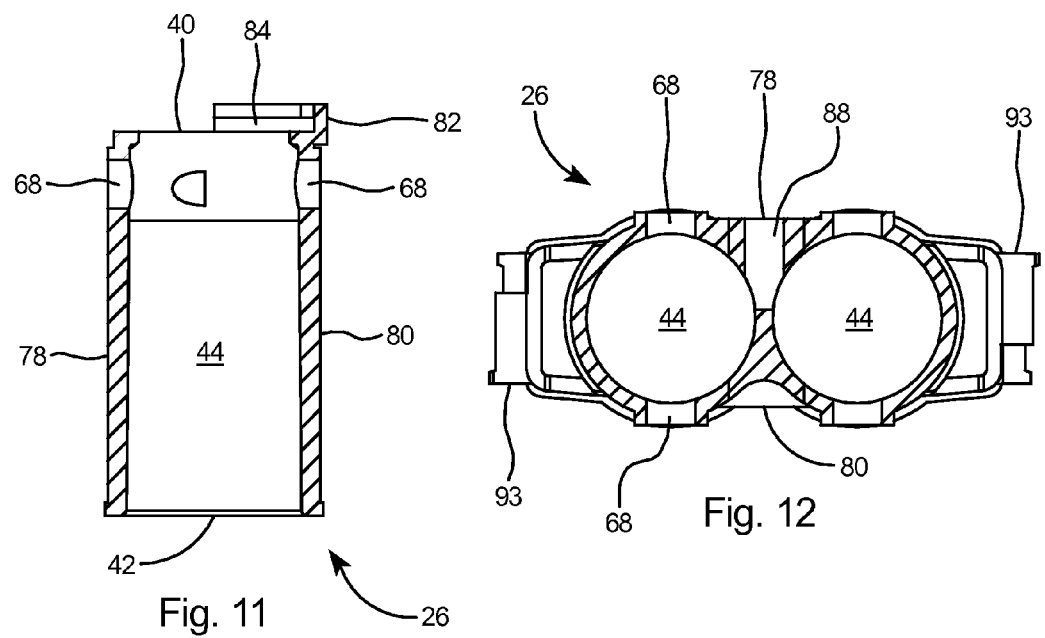
Fig. 11
Fig. 12
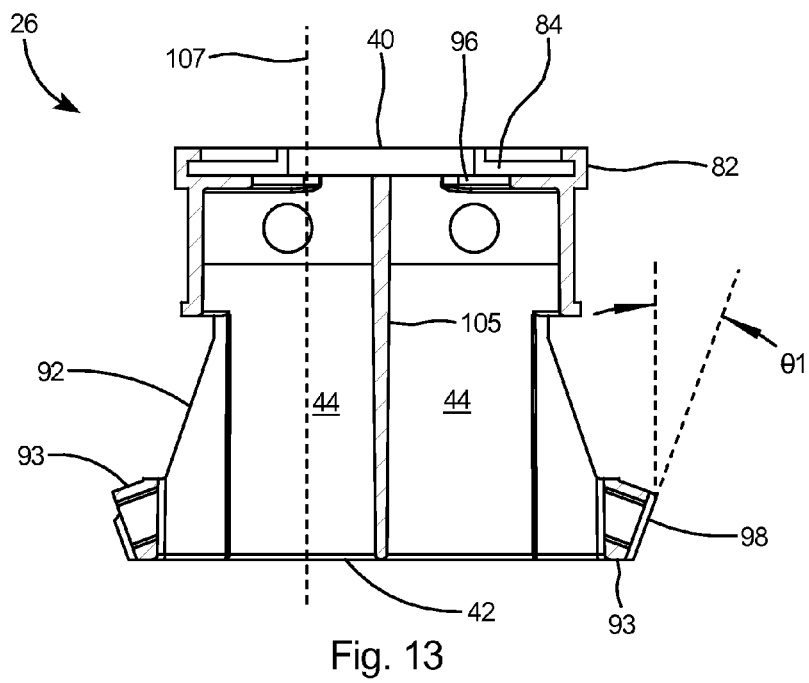
Fig. 13

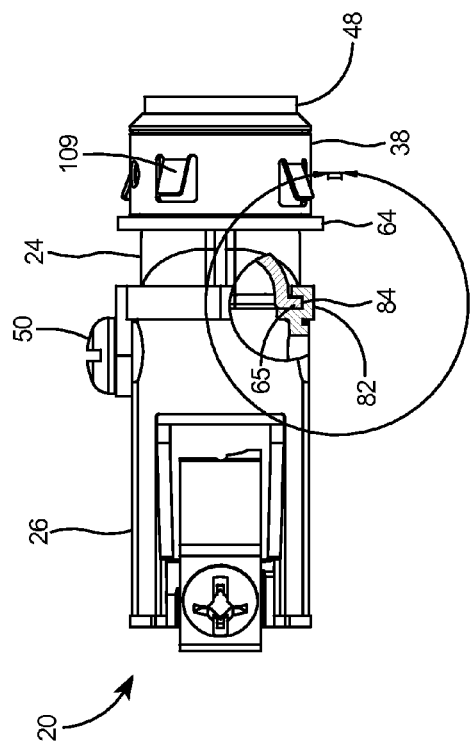
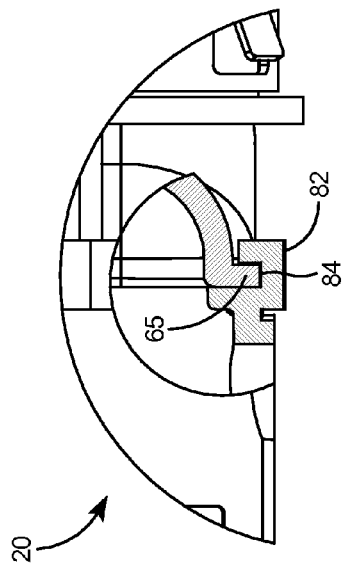
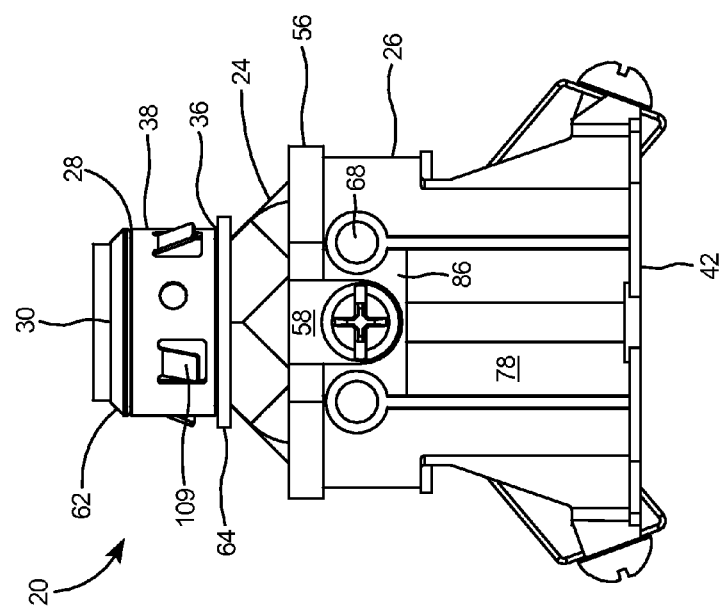
Fig. 17
Fig. 18
Fig. 16

TWO-PIECE DUPLEX ELECTRICAL
FITTING WITH EXTERNAL CABLE
RETAINER

This application claims the priority of Provisional U.S. Patent Application Ser. No. 62/006,063 filed May 31, 2014.

FIELD OF THE INVENTION

This invention relates to electrical fittings or connectors for connecting electrical cables to a panel and specifically to a duplex electrical fitting or connector having a two-piece connector body in which the body pieces can be easily disconnected and slid apart for inspection or reconnection of an electrical cable to the trailing end of the fitting.

BACKGROUND

Duplex quick-connect electrical fittings are commonly used to rapidly connect two electrical cables to a single knockout aperture in an electrical box or electrical panel. Duplex quick-connect electrical fittings typically include a two-piece connector body having a trailing body portion with two bores therein for insertion of electrical cables and a leading body portion with a single bore therein for insertion into a knockout aperture of the electrical panel.

In a typical two-piece duplex quick-connect electrical fitting, the leading body portion includes an opening that accepts the trailing body portion and the two pieces are pressed together and connected by a screw or similar fastener. The two body portions are typically axially aligned and connected end-to-end, with the trailing body portion pressed within the opening of the leading body portion. Constructing a duplex fitting with axially aligned and joined end-to-end body portions typically adds substantial width and length to the resultant fitting as the leading body portion must be made large enough to accept the entire trailing body portion.

The amount of metallic alloy material used to construct the connector body portions directly affects the cost of the resultant fitting. It is therefore advantageous for manufacturers to minimize the size of the body portions to reduce unit production costs. Furthermore, there are times when an installer must disassemble the duplex fitting after it has been initially connected to a box or panel, such as for inspection or removal of the inserted electrical cables. In a conventional two-piece duplex fitting, it is difficult to separate the two body portions in order to inspect or remove the connected electrical cables.

Accordingly, what is needed is a duplex electrical fitting that lowers unit production costs. Furthermore, the duplex electrical fitting must be capable of being easily disassembled after connection to an electrical box to allow inspection of the inserted electrical cables.

BRIEF SUMMARY OF THE INVENTION

The current invention is a duplex electrical connector including a front connector body slidably connected to a rear connector body. The front connector body includes a leading end, a trailing end with a bottom periphery, a top side, a nose portion at the leading end, and a leading bore therein. The rear connector body includes a leading end, a trailing end, and two trailing bores extending from the trailing end to the leading end. A lip extends along the top side of the trailing end of the front connector body. A tab with an aperture therein extends from the top lip. A front extension extends from the leading end of the rear connector body. A trailing flange extends along the bottom periphery of the trailing end of the front connector body. Rear connector body includes a boss having an aperture therein, with the axis of the bore at substantially a right angle with respect to the axes through the trailing bores of the rear connector body. Front connector body is assembled to rear connector body by sliding the trailing flange of front connector body into open channel of front extension of rear connector body and affixing a screw through tab of front connector body into the boss of rear connector body. Such sliding assembly of the connector bodies enables minimizing the size of the connector bodies while enabling easy disassembly of the two connector body portions for inspection of internal cable connections. Nose portion of front connector body includes a seat and a snap ring disposed on the seat to facilitate connection of the duplex electrical connector to an electrical box or panel. A clip member, secured to the rear connector body adjacent each trailing bore, includes legs that extend into the trailing bores of the duplex electrical connector and engage an electrical cable as it is pushed into one or both bores of the connector.

OBJECTS AND ADVANTAGES

A first object of the current invention is to provide a duplex electrical fitting that enables easy snap-in insertion of an electrical cable into an electrical box, including easy snap-in insertion of an electrical cable at the trailing end of the fitting and easy snap-in insertion of the leading end of the fitting into the knockout of the electrical box.

A second object of the invention is to enable a reduction in size to realize a reduction in the unit production costs of duplex electrical fittings.

A further object of the invention is to provide a duplex electrical fitting including a two-piece connector body that may be easily disassembled for inspection of electrical cable connections.

A further object of the invention is to provide a two-piece duplex electrical fitting in which the pieces assemble and disassemble in a sliding manner, the direction of the assembly and disassembly being at substantially right angles to the axes of bores extending through the two-piece fitting.

DESCRIPTION OF THE DRAWINGS

FIG. 8 is a top view of a rear connector body that forms a portion of the duplex electrical connector shown in FIG. 1.

FIG. 9 is a bottom view of the rear connector body.

FIG. 10 is a side view of the rear connector body.

FIG. 11 is a sectional view of the rear connector body taken along line 11-11 of FIG. 9.

FIG. 12 is a sectional view of the rear connector body taken along line 12-12 of FIG. 9.

FIG. 13 is a sectional view of the rear connector body taken along line 13-13 of FIG. 10.

FIG. 16 is a top view of a duplex electrical connector assembly according to the present invention.

FIG. 17 is a side view of the duplex electrical connector assembly of the present invention.

FIG. 18 is a detail view of the portion of the duplex electrical connector assembly circled in FIG. 17.

DETAILED DESCRIPTION

Figure 1:
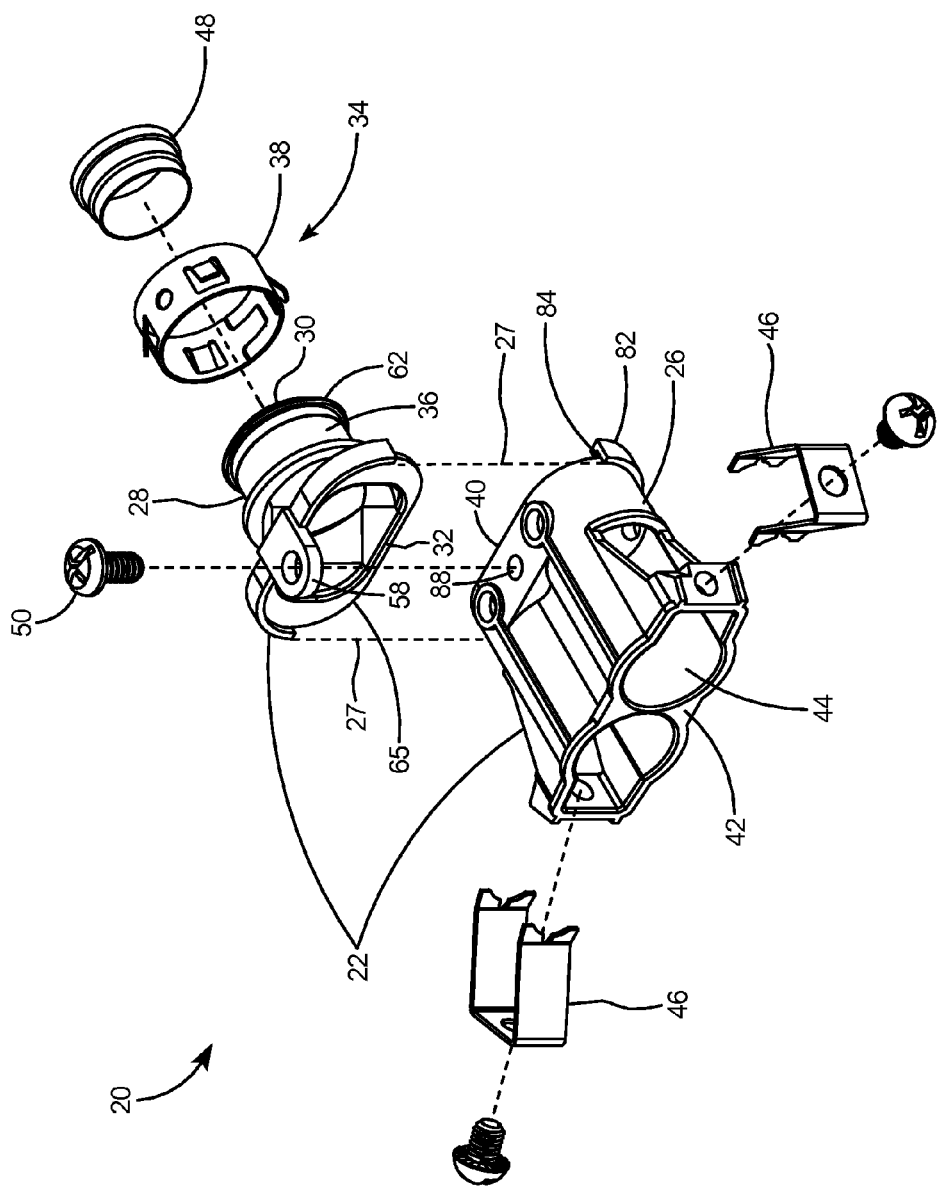
FIG. 1 is an exploded perspective view of the preferred embodiment of a duplex electrical connector according to the present invention.

With reference to FIG. 1 there is shown a preferred embodiment of the present invention, a duplex electrical connector 20 that is an assembly of a two-piece die cast connector body 22 including a front connector body 24 and a rear connector body 26. The front connector body 24 and rear connector body 26 are slideably connectable to one another along lines 27 as shown in FIG. 1. The front connector body 24 includes a nose portion 28 and a leading end 30 and a trailing end 32. A fastening arrangement 34 is included on the leading end 30 of the front connector body 22 for fastening the duplex electrical connector 20 to an electrical panel or junction box (not shown). The fastening arrangement 34 includes a seat 36 on the nose portion 28 and a snap ring 38 that is shown exploded away from the leading end 30 of the front connector body 24. The rear connector body 26 includes a leading end 40 and a trailing end 42 with two trailing bores 44 therein. A clip member 46 is secured to the rear connector body 26 adjacent each trailing bore 44. An optional throat insert 48 may be inserted the nose portion 28 of the front connector body 26 and a fastener 50 secures the front connector body 24 and rear connector body 26 together.

Figure 2:
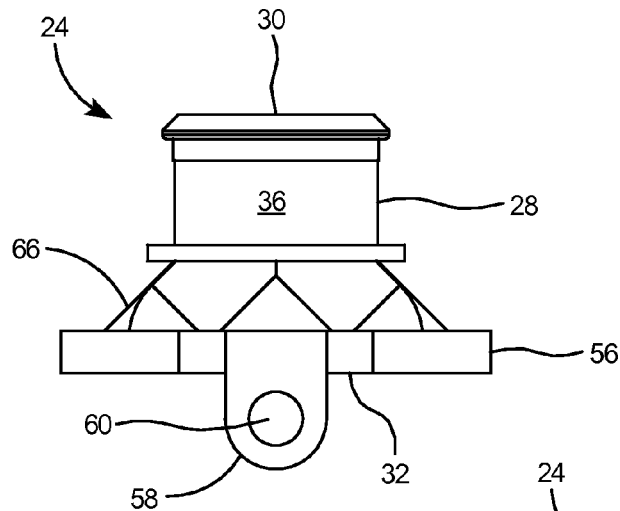
FIG. 2 is a top view of a front connector body that forms a portion of the duplex electrical connector shown in FIG. 1.
Figure 3:
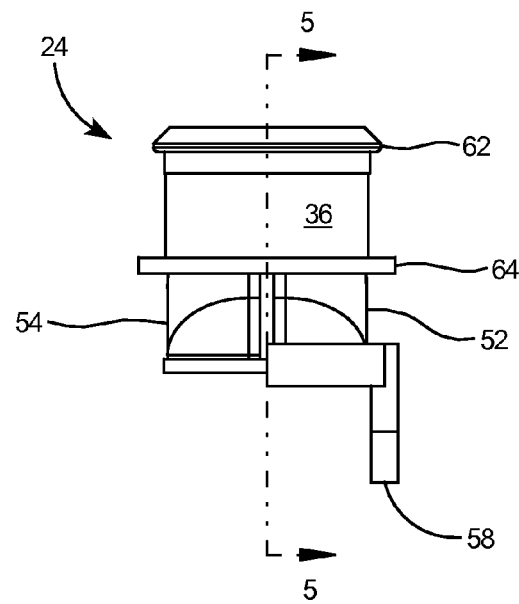
FIG. 3 is a side view of the front connector body.
Figure 4:
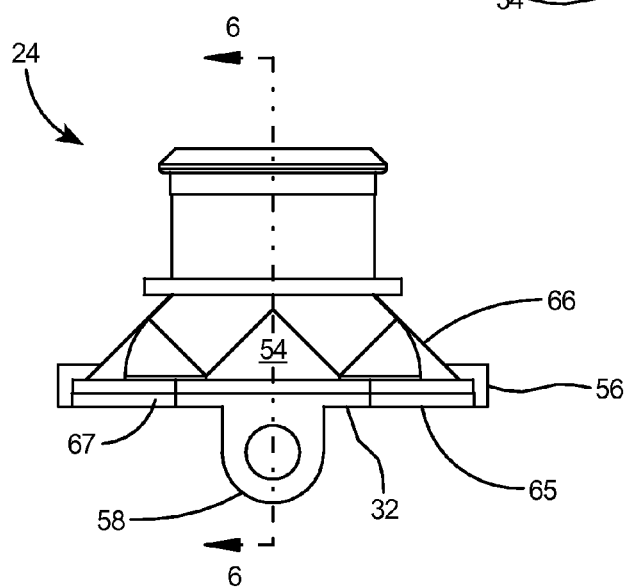
FIG. 4 is a bottom view of the front connector body.

Referring to FIGS. 2-4, the front connector body 24 includes a top side 52, a bottom side 54, and a lip 56 extending from the top side 52 of the body 24 at the trailing end 32. A tab 58 extends from the lip 56 at the top side 52 of the front connector body 24 as shown in FIG. 3 and includes an aperture 60 therein. The front connector body 24 further includes a leading flange 62 and an intermediate flange 64 surrounding the seat 36. A trailing flange 65 extends along the bottom periphery 67 of the trailing end 32. The front connector body further includes rounded shoulders 66. Two viewports 68 are included on both the top side 52 and bottom side 54 of the front connector body 24.

Figure 5:
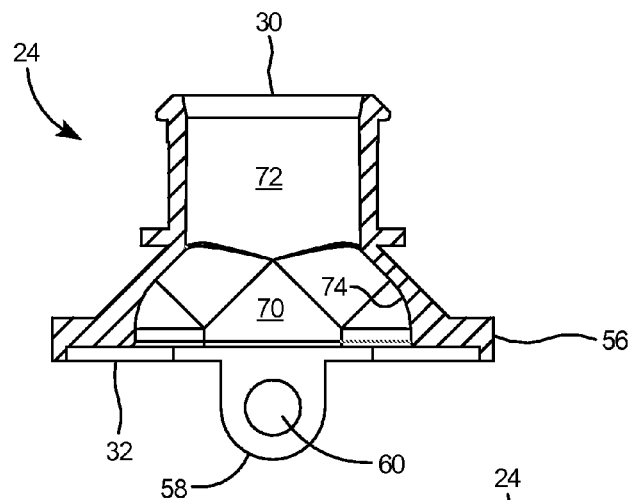
FIG. 5 is a sectional view of the front connector body taken along line 5-5 of FIG. 3.
Figure 6:
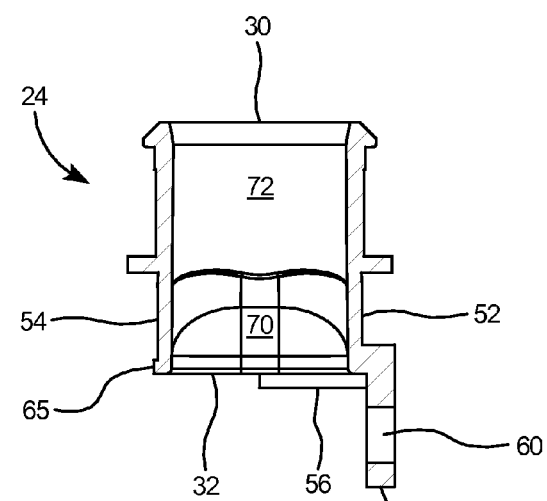
FIG. 6 is a sectional view of the front connector body taken along line 6-6 of FIG. 4.
Figure 7:
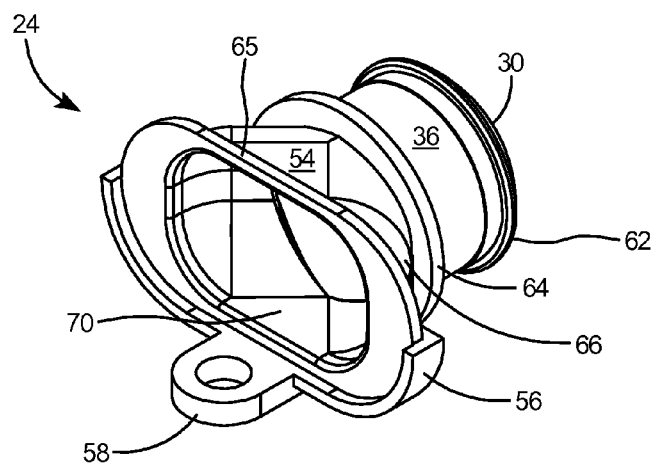
FIG. 7 is a bottom perspective view of the front connector body

With reference to FIGS. 5-7, the front connector body 24 includes a wide bore 70 at the trailing end 32 narrowing to a narrower leading bore 72. The interior walls 74 that form the transition from the wide bore 70 to the leading bore 72 are smooth, gradually arcuate, and devoid of sharp edges to enable easy passage of wire conductors from the wide bore 70 to the leading bore 72. Each viewport 68 on the top side 52 is axially aligned with a viewport on the bottom side 54 of the front connector body 24 as shown by axis 76 in FIG. 7.

Referring to FIGS. 8-10, the rear connector body 26 includes a top side 78, a bottom side 80, and a front extension 82 extending from the lower half 83 of the leading end 40. The front extension 82 extends from the lower half of the rear connector body and includes an open channel 84 therein. A boss 86 is included on the top side 78 of the rear connector body 26 and includes an aperture 88 therein. The rear connector body includes two sides 90 and an open channel 92 in each side, with each of the channels in communication with one of the trailing bores 44. A wing 93 extends from each side 90 of the rear connector body at the trailing end 42.

Figure 14:
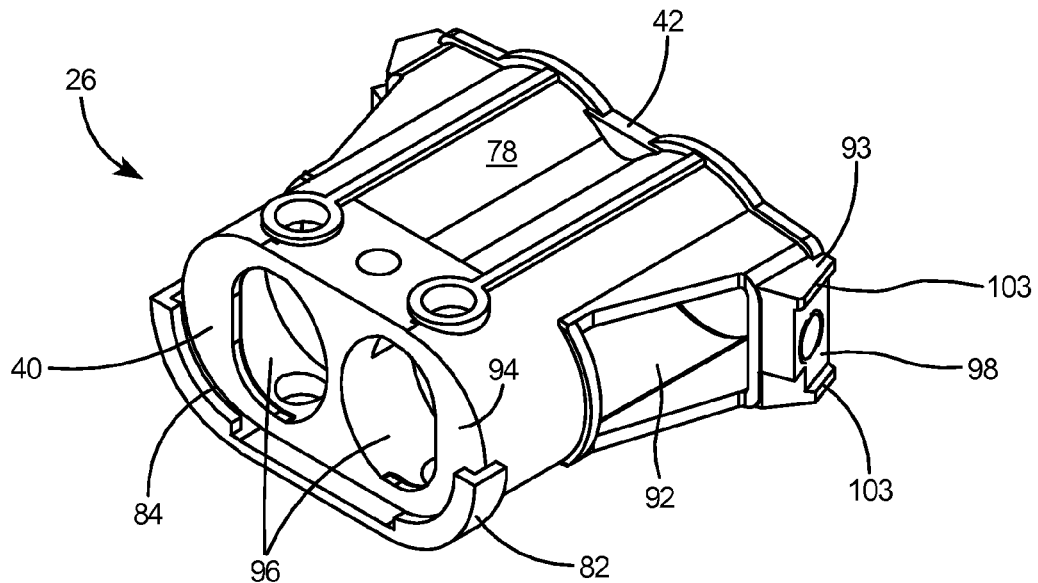
FIG. 14 is a top isometric view of the rear connector body.
Figure 15:
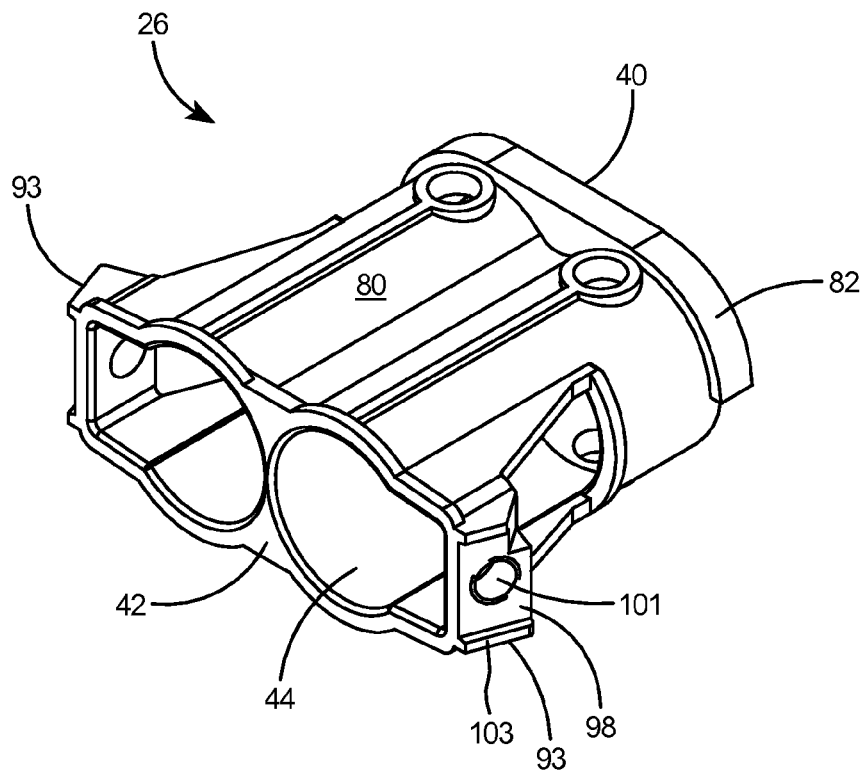
FIG. 15 is a bottom isometric view of the rear connector body.

With reference to FIGS. 14-15, rear connector body 26 at the leading end 40 includes a cable stop 94 with two conductor openings 96 therein. Each wing 93 includes a flat mounting surface 98 with an aperture 101 therein. Two rails 103 are provided on each side of the flat mounting surface. As shown in FIG. 13, a longitudinal wall 105 separates the two trailing bores 44 in the second connector body 26. Each trailing bore 44 includes an axial center 107 that substantially extends through the conductor openings 96 at the leading end 40 of the second conductor body 26. Each flat mounting surface 98 is preferably at an angle $\theta 1$ with respect to the axial center 107. Most preferably, angle $\theta 1$ is between 20 and 40 degrees.

With reference to FIG. 1 the duplex electrical connector 20 is assembled by joining trailing end 32 of front connector body 24 to leading end 40 of rear connector body 26 and sliding the front connector body along lines 27 until trailing flange 65 of front connector body 24 seats in open channel 84 of rear connector body 26. The front connector body 24 is then secured to the rear connector body 26 together with fastener 50 driven through tab 58 into aperture 88 of second connector body to form a two-piece die cast connector body 22.

Referring to FIGS. 16-18, snap ring 38, which is preferably a split ring formed of a resilient metal and in its unbiased state includes a diameter smaller than the diameter of the seat 36, includes locking tangs is slightly expanded to slip over the leading flange 62 and is then secured onto the seat 36 on the nose portion 28 of front connector body 24. The snap ring 38 includes locking tangs 109 thereon. The locking tangs 109 will function to secure the leading end 30 of the duplex electrical connector 20 to an electrical box or panel (not shown). Leading flange 62 and intermediate flange 64 surround the seat 36 and hold snap ring 38 in place on the connector.

Figure 19:
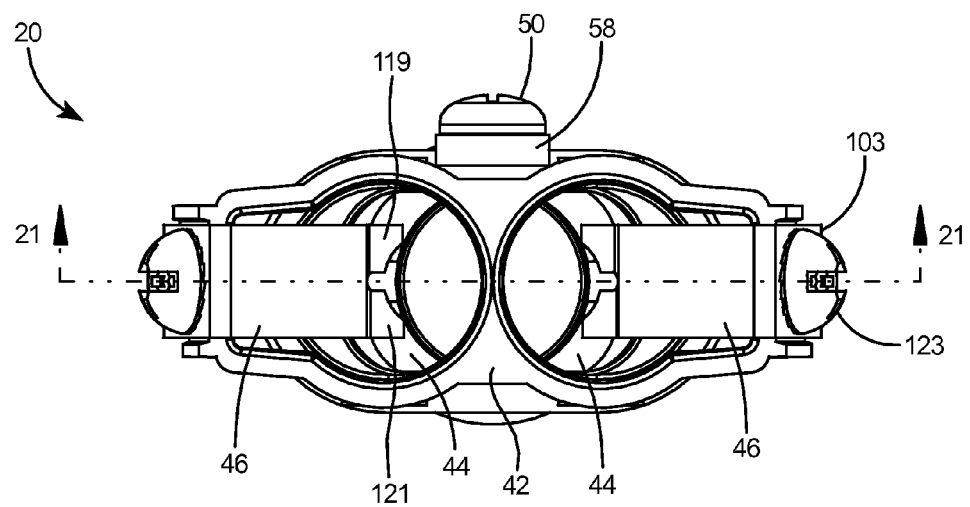
FIG. 19 is an elevation view of the duplex electrical connector assembly as viewed from the trailing end.
Figure 20:
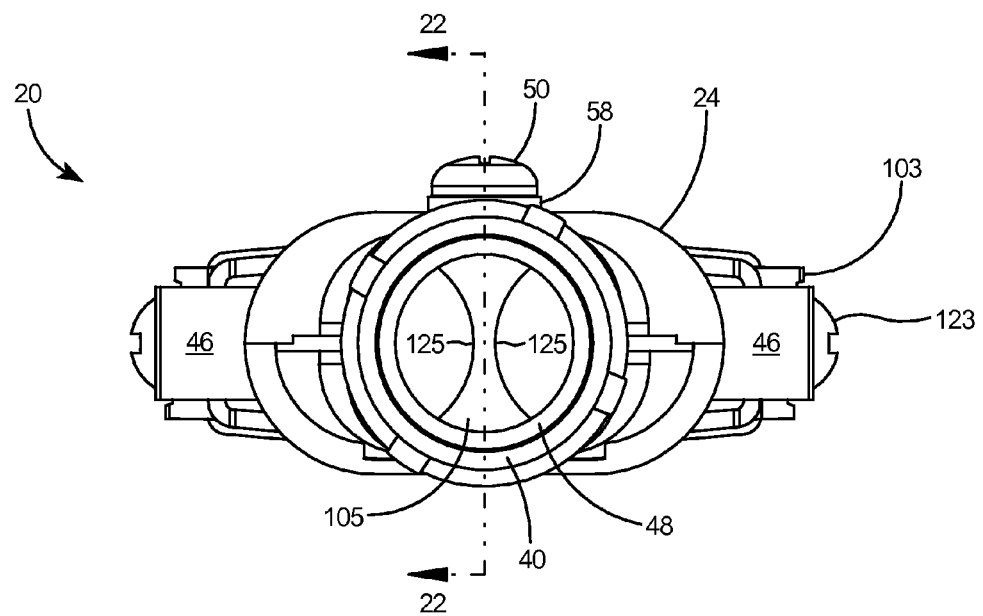
FIG. 20 is an elevation view of the duplex electrical connector assembly as viewed from the leading end.
Figure 25:
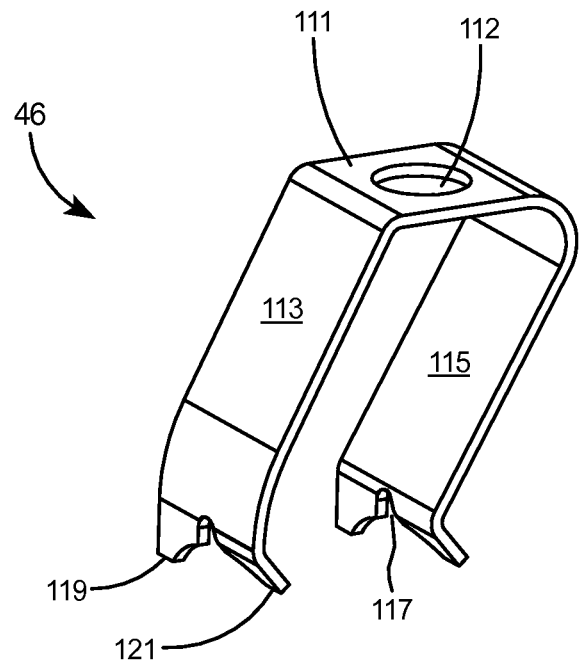
FIG. 25 is an isometric view of a clip member that forms a portion of the duplex electrical connector assembly of the present invention.

With reference to FIG. 25, the clip member 46 includes a base 111 having an aperture 112 therein, a leading tang 113, a trailing tang 115, and a notch 117 at the end of each tang defining a first leg 119 and second leg 121 extending at different angles from each tang 113 and 115. As shown in FIGS. 19 and 20, a clip member 46 is attached to each of the flat mounting surfaces 98 at the trailing end 42 adjacent each trailing bore 44. A fastener 123 secures each clip member 46 to the second rear connector body 26 portion of the duplex electrical connector 20. As shown in FIG. 20, a longitudinal wall 105 includes opposing arcuate surfaces 125 defining a portion of the cylindrical trailing bores 44 (see FIG. 19).

Figure 21:
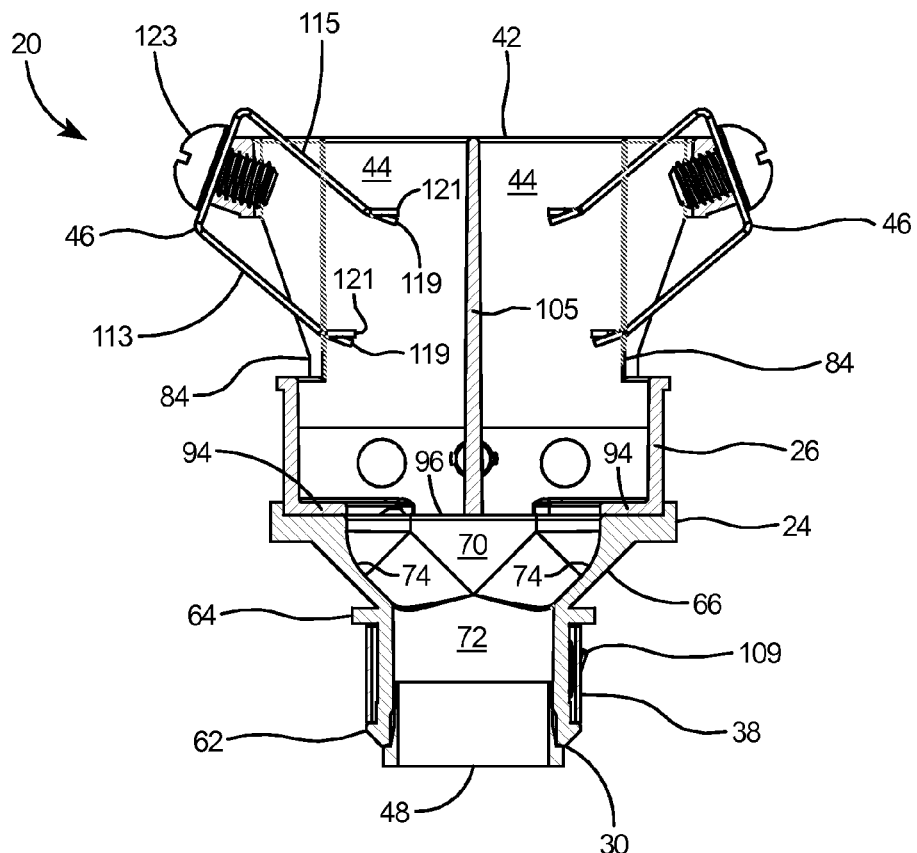
FIG. 21 is a sectional view of the duplex electrical connector assembly taken along line 21-21 of FIG. 19.
Figure 22:
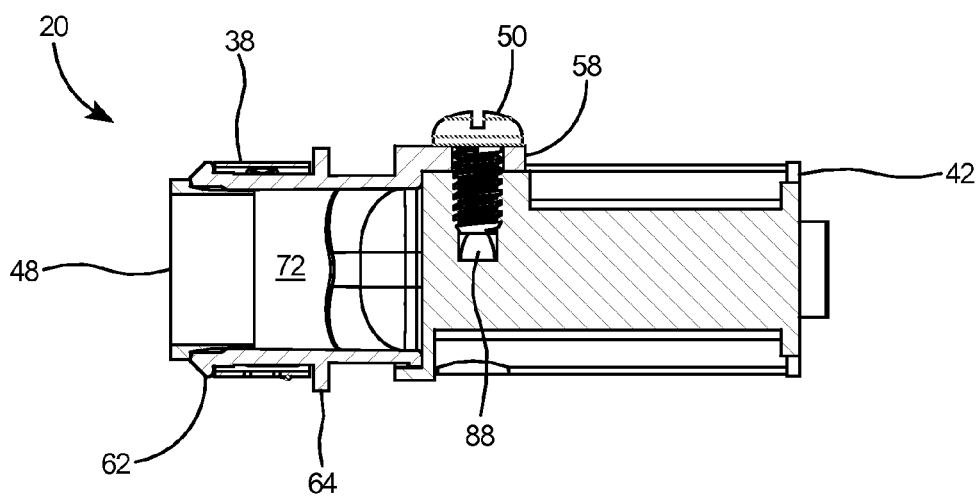
FIG. 22 is a sectional view of the duplex electrical connector assembly taken along line 22-22 of FIG. 20.

Referring to FIG. 21, the interior walls 74 that form the transition from the wide bore 70 to the leading bore 72 are preferably are smooth, gradually arcuate, and devoid of sharp edges to enable easy passage of wire conductors from the wide bore 70 to the leading bore 72. Optional throat insert 48 is preferably constructed of plastic and, when used, prevents abrasion to wire connectors as they are inserted through the leading bore 72 portion of the duplex connector.

Figure 26:
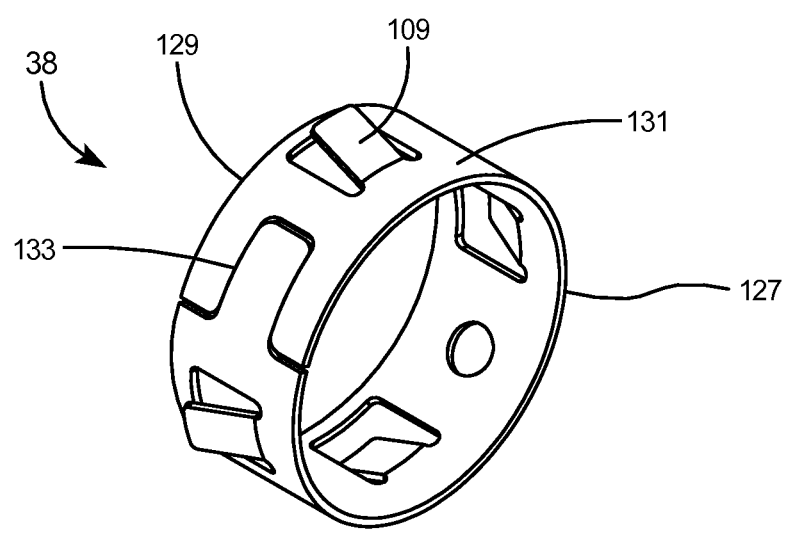
FIG. 26 is an isometric view of a snap ring that forms a portion of the duplex electrical connector assembly of the present invention.

As shown in FIG. 26, the snap ring 38 is a split ring that includes a leading edge 127, a trailing edge 129, and a plurality of locking tangs 109 around the ring body 131. The snap ring 38 is formed from a flat metal blank (not shown) and is bent into the substantially cylindrical shape. The two ends of the snap ring substantially meet each other at the split 133.

Figure 23:
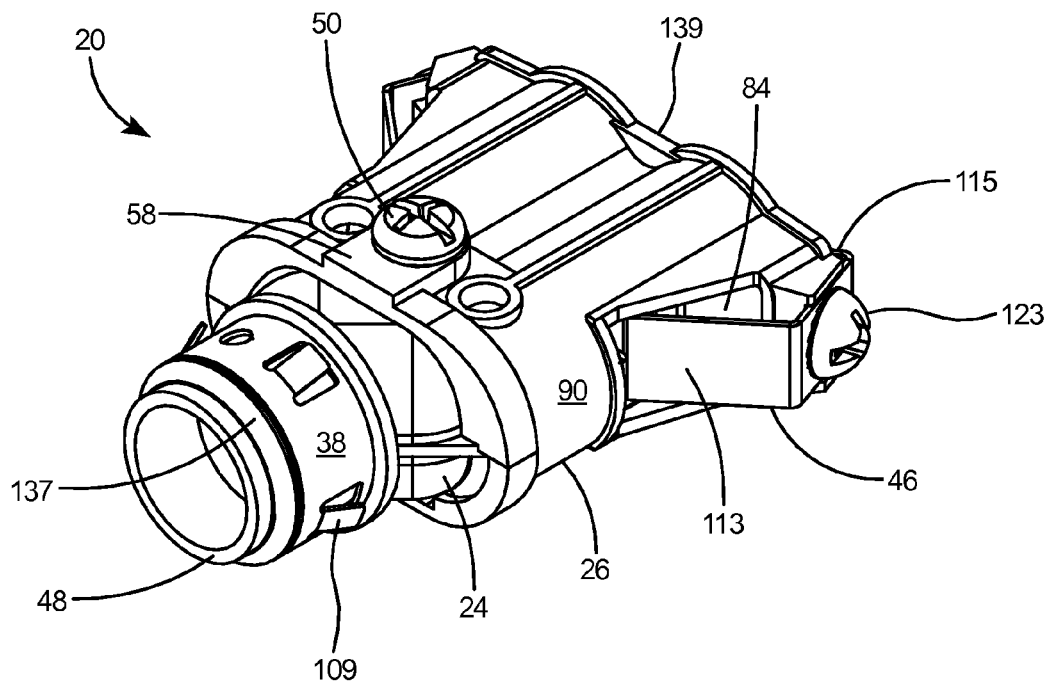
FIG. 23 is a top isometric view of the duplex electrical connector assembly as viewed from the leading end.
Figure 24:
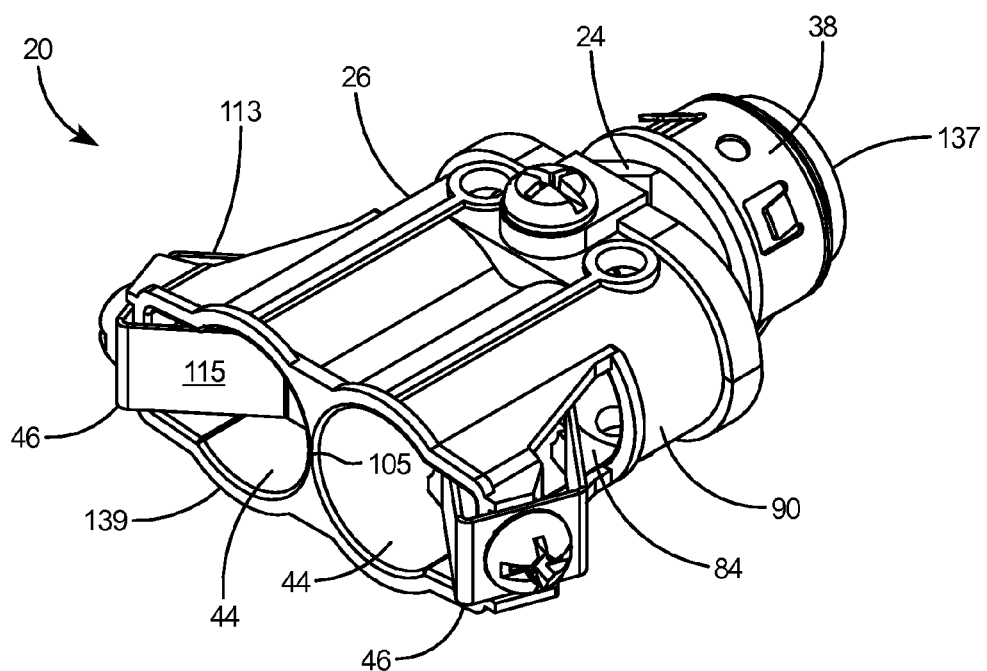
FIG. 24 is a top isometric view of the duplex electrical connector assembly as viewed from the trailing end.

With reference to FIGS. 23 and 24, the clip members 46 are preferably formed of a resilient metal and are secured to the rear connector body 26 with the leading tang 113 extending into the open channel 84 in the sides 90 of the rear connector body. The trailing tangs 115 of each clip member 46 extend into the trailing bores 44 of the duplex connector.

Throat insert 48, preferably constructed of plastic, is pressed into the leading bore 72 (see FIG. 6) of front connector body 24 and held therein by a friction fit. Throat insert 48, optional for use on the duplex electrical connector 20, acts to shield wire conductors from the interior of the leading bore in order to minimize fraying or abrasion of the outer sheath of the conductors (not shown).

With reference to FIG. 21, in their unbiased state the clip members 46 and their legs 119 and 121 extend into the trailing bores 44 as shown. When an electrical cable (not shown) is pushed into one or both bores 44, the legs 119 and 121 of both clip members engage the electrical cable in that bore 44. The electrical cables are advanced until stopped by cable stop 94 at the juncture between the front connector body 24 and rear connector body 26. The wire conductors (not shown) at the front of the electrical cables continue forward through the conductor openings 96 and through the leading bore 72 of the duplex connector.

Referring to FIGS. 17-18, to secure the two connector body portions 24 and 26 together, front connector body 24 is slid sideways with respect to rear connector body 26 in the direction of arrow 135 until trailing flange 65 of front connector body 24 latches into open channel 84 on front extension 82 of rear connector body 26. Fastener 50 is then secured through aperture 60 in tab 58 of front connector body 24 into aperture 88 in rear connector body 26.

With reference to FIGS. 23 and 24, the duplex electrical connector 20 includes a leading end 137 and a trailing end 139. The connector is used to secure one or two electrical cables (not shown) to a panel or an electrical box. To operate the invention, leading end 137 is simply pressed into the knockout hole of an electrical box. Locking tangs 94 on snap ring 38, being constructed of resilient metal such as spring steel, deflect inward when in contact with the walls of the knockout and then spring outward to their unbiased position after clearing the wall. The leading end is then securely locked into the knockout in the electrical box. One or two electrical cables (not shown) are then inserted into the bores 44 on the trailing end 139 of the duplex connector 20. The leading tangs 113 and trailing tangs 115 of clip member 46 then direct each electrical cable into contact with the longitudinal wall 105 at the center of the connector. When fully inserted and in contact with end stop 94 (see FIG. 21), the electrical cables are locked securely to the duplex connector 20 by the clip members 46. The types of electrical cables and conduits that can be connector to an electrical box with the duplex electrical connector 20 include MC/HCF steel or aluminum cable, AC/HCF steel or aluminum cable, flexible metal conduit steel and aluminum, including both regular and reduced wall thickness, and MC cable continuous corrugated aluminum.

Preferably, the front connector body 24 and rear connector body 26 are each die-cast in one-piece of moldable metals, such as zinc alloy. The snap ring 38 and clip members 46 are preferably constructed of spring steel. The throat insert 48 is preferably constructed of plastic.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A duplex electrical fitting, comprising:
   a front connector body including a leading end and a trailing end, a top periphery, and a bottom periphery;
   a lip extending from said trailing end of said front connector body;
   a trailing flange extending from said trailing end of said front connector body;
   a tab with an aperture therein extending from said top lip;
   a rear connector body including a leading end, a boss with an aperture therein, and two trailing bores;
   a front extension extending from said leading end of said rear connector body;
   an open channel on said front extension of said rear connector body, said open channel of said rear connector body capable of accepting transverse sliding engagement of said trailing flange of said front connector body into said open channel of said rear connector body for connection of said body portions; and
   a fastener for insertion through said tab of said front connector body and into said boss of said rear connector body.

2. The duplex electrical fitting of claim 1, further comprising
   a nose portion on said front connector body; and
   a seat on said nose portion.

3. The duplex electrical fitting of claim 2, further comprising a snap ring on said seat of said nose portion.

4. The duplex electrical fitting of claim 1, further comprising a clip member secured to the rear connector body adjacent each trailing bore.

5. The duplex electrical fitting of claim 1, wherein said sliding engagement of said connector bodies is at substantially a right angle to the axial alignment of said trailing bores of said rear connector body.

6. The duplex electrical fitting of claim 4, further comprising
   a trailing end and a side on said rear connector body; and
   a wing extending from said side of said rear connector body at said trailing end.

7. The duplex electrical fitting of claim 6, further comprising a flat mounting surface on said wing, said clip member secured to said flat mounting surface.

8. The duplex electrical fitting of claim 6, further comprising an open channel in said side of said rear connector body.

9. The duplex electrical fitting of claim 3, further comprising a locking tang on said snap ring.

10. The duplex electrical fitting of claim 4, further comprising
    a base on said clip member; and
    an aperture in said base.

11. The duplex electrical fitting of claim 10, further comprising a leading tang and a trailing tang extending from said base of said clip member, said leading tang and trailing tang including an end.

12. The duplex electrical fitting of claim 11, further comprising a notch at the end of said leading tang and said trailing tang of said clip member.

13. The duplex electrical fitting of claim 12, further comprising
- a first leg and a second leg extending from said leading tang and said trailing tang; and
- said first leg extending at a different angle from said tangs than said second leg.

\* \* \* \* \*